May 24, 1932.  H. JOEKEL  1,859,563

BRACE BAR FOLDING DEVICE

Filed Oct. 6, 1930

Inventor
Hobert Joekel

By Emil F. Lange
Attorney

Patented May 24, 1932

1,859,563

UNITED STATES PATENT OFFICE

HOBERT JOEKEL, OF STERLING, NEBRASKA

BRACE BAR FOLDING DEVICE

Application filed October 6, 1930. Serial No. 486,708.

This invention relates to brace bar folding devices especially adapted to facilitate the operation of braces for supporting the deck or cover of an automobile body in an open position and has for the primary object, the provision of means whereby a person may easily and safely move the braces simultaneously into extended or collapsed positions as desired without the necessity of manually operating each of the braces separately as is now customary, consequently rendering a large saving in time and labor in opening and closing the deck or cover of the body and with the maximum amount of safety.

Another object of this invention is the provision of an operating member carried by the deck or cover and connected to the braces, where by the actuation thereof, the braces may be either collapsed or extended and forced into latched position to support the deck or cover with safety.

A further object of this invention is the provision of a brace bar folding device of the above stated character which will be simple, durable and efficient, and which may be manufactured and sold at a comparatively low cost.

Having in view these objects and others which will be pointed out in the following description, I will now refer to the drawings, in which Figure 1 is a perspective view illustrating a brace bar folding device constructed in accordance with my invention and applied to the cover or deck of an automobile body and connected to the folding braces employed for supporting the cover or deck in an open position.

Referring in detail to the drawings, the numeral 10 indicates a fragmentary portion of an automobile body and which forms a compartment for carrying luggage and other articles and is closed by a hinged cover or deck 12 provided with a suitable handle 13 for opening and closing the cover or deck as desired.

Figure 1:
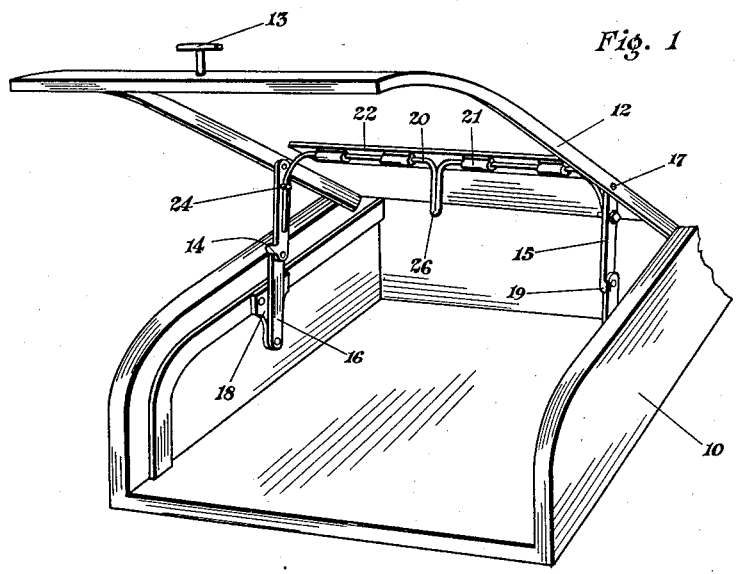
Figure 2:
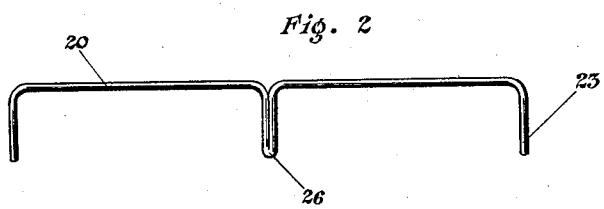
Figure 2 is a plan view illustrating the actuating member.

Braces 14 are employed for supporting the cover or deck 13 in an open position as shown in Figure 1 and each includes pivotally connected members 15 and 16. The member 15 is pivotally connected to the deck or cover as shown at 17 while the member 16 is pivoted to a bracket 18 secured to the side of the automobile body. The member 15 at the end which is pivoted to the member 16 is provided with a laterally extending ear or projection 19 adapted to engage the member 16 when the members 15 and 16 are extended for the purpose of supporting the cover or deck to prevent collapsing of the members 15 and 16 while supporting the cover or deck.

Figure 4:
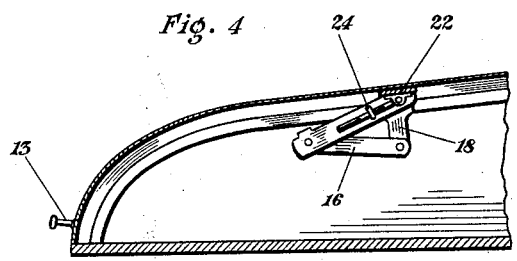
Figure 4 is a longitudinal sectional view illustrating the cover or deck of the automobile body in a closed position with the brace collapsed.

The foregoing description relates to a well known construction especially adaptable for supporting the cover or deck of an automobile in a raised or elevated position and to which my invention is applied. When the deck or cover is in the position shown in Figure 1 and it is desired to move the same into the position shown in Figure 4, it has heretofore been necessary for a person to break the braces 14 at the pivotal connections between the members 15 and 16, consequently requiring the use of both hands to accomplish this operation which is dangerous as when both braces are collapsed the cover or deck falls to a closed position and in many instances has injured the person by striking or mashing the hands or arms or other parts of the body. To obviate this danger my invention is employed.

Figure 3:
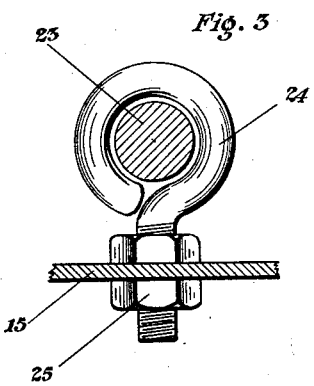
Figure 3 is a detailed view partly in section illustrating the means of connecting the actuating member to one section of the brace.

An operating bar or member 20 is journaled to the under side of the cover or deck 12 by brackets 21 which are secured to a bracing strip 22 now in use on the cover or deck. If desired, however, the brackets 21 may be secured directly to the cover or deck when this is not provided with the bracing strip 22. The ends of the bar or member 20 are bent angularly to form attaching arms 23 extending parallel with the members 15 of the braces 14 and are slidably received in eye bolts 24 journaled to the member 15 as shown in Figure 3. The eye bolts 24 extend through openings in the member 15 of the braces 14 and are threaded to receive nuts 25. It will therefore be seen that the arms 23 are slidably and pivotally connected to the members 15 of the braces 14.

The bar or member 20 intermediate its ends is bent upon itself to form a handle 26 whereby a person may turn the rod member in either direction for the purpose of actuating the braces 14.

In operation, a person opens the cover or deck by the handle 13 and into a position as shown in Figure 1 and with the other hand moves the handle 26 in one direction causing the rod or member 20 through the arms 23 to extend the braces into locked position as shown in Figure 1. To close the cover or deck, the person reverses the operation by taking hold of the handle 13 with one hand and moving the handle 26 in an opposite direction which collapses the braces 14 and permits the cover or deck to fall into closed position at the will of the person holding the handle 13, consequently obviating any danger of the cover or deck falling to a closed position while the person is in the act of collapsing the braces 14.

While I have shown and described the preferred embodiment of my invention, it will be understood that minor changes in construction, combination and arrangement of parts may be made without departing from the spirit and scope of the invention as claimed.

Having thus described my invention in such full, clear, and exact terms that its construction and operation will be readily understood by others skilled in the art to which it pertains, what I claim as new and desire to secure by Letters Patent of the United States is:

1. A device of the character set forth including a hinged deck of an automobile body and collapsible braces therefor, an actuating member journaled to the deck, arms formed on the ends of the member, eye bolts slidably receiving the arms and pivotally connected to the braces, and a handle on said member to actuate the braces simultaneously.

2. A device of the character set forth including a hinged deck for an automobile body and braces therefor, each of said braces comprising an upper and a lower member pivotally connected together in end to end relation and foldable on each other, a member journalled to the deck and having its ends angularly related to form arms extending parallel with the upper of said brace members, pivotal and slidable connections between said arms and the upper of said brace members, said member bent upon itself intermediate its ends to form a handle to permit actuation of the braces simultaneously.

In testimony whereof I affix my signature.
HOBERT JOEKEL.